(12) United States Patent
Solmeyer et al.

(10) Patent No.: US 11,990,945 B2
(45) Date of Patent: May 21, 2024

(54) SYSTEM FOR CLOCK SYNCHRONIZATION WITH POLARIZATION ENTANGLED PHOTONS

(71) Applicant: Honeywell International Inc., Charlotte, NC (US)

(72) Inventors: Neal Solmeyer, Plymouth, MN (US); Chad Fertig, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 153 days.

(21) Appl. No.: 17/808,270

(22) Filed: Jun. 22, 2022

(65) Prior Publication Data
US 2022/0416906 A1   Dec. 29, 2022

Related U.S. Application Data

(60) Provisional application No. 63/215,298, filed on Jun. 25, 2021.

(51) Int. Cl.
| | | |
|---|---|---|
| *H04B 10/70* | (2013.01) | |
| *G02B 6/27* | (2006.01) | |
| *G04F 5/14* | (2006.01) | |
| *G06N 10/60* | (2022.01) | |

(52) U.S. Cl.
CPC ........... *H04B 10/70* (2013.01); *G02B 6/2773* (2013.01); *G04F 5/14* (2013.01); *G06N 10/60* (2022.01)

(58) Field of Classification Search
CPC ..................................................... H04B 10/70
See application file for complete search history.

(56) References Cited

U.S. PATENT DOCUMENTS

| | | |
|---|---|---|
| 11,079,542 B2 | 8/2021 | Fertig et al. |
| 11,268,806 B2 | 3/2022 | Fertig et al. |
| 11,320,720 B2 | 5/2022 | Puckett et al. |
| 2020/0084033 A1 | 3/2020 | Lamas-Linares et al. |

(Continued)

FOREIGN PATENT DOCUMENTS

| | | |
|---|---|---|
| WO | 2005091548 A1 | 9/2005 |
| WO | 2020140852 A1 | 7/2020 |

OTHER PUBLICATIONS

Quan et al., "Demonstration of quantum synchronization based on second order quantum coherence of entangled photons", Scientific Reports, Jul. 2016 (Year: 2016).*

(Continued)

*Primary Examiner* — Shi K Li
(74) *Attorney, Agent, or Firm* — Shumaker & Sieffert, P.A.

(57) ABSTRACT

A system includes a quantum light device comprising a light source configured to emit a plurality of pairs of photons, wherein each pair of photons of the plurality of pairs of photons occupies a quantum entangled state. The system also includes optical circuitry configured to receive a first set of photons and a second set of photons. A set of photon detectors may receive the first set of photons and the second set of photons from the optical circuitry. Additionally, the system may include processing circuitry configured to determine, based on a set of time signals corresponding to each photon detector of the set of photon detectors, whether a time delay value exists in which a Clauser, Horne, Shimony and Holt (CHSH) parameter is greater than a threshold CHSH parameter value.

20 Claims, 5 Drawing Sheets

(56) References Cited

U.S. PATENT DOCUMENTS

2021/0105135 A1* 4/2021 Figueroa .............. H04B 10/70
2022/0029711 A1 1/2022 Guo et al.

OTHER PUBLICATIONS

Kaltenbaek et al., "High-fidelity entanglement swapping with fully independent sources", Physical Review A 79, 040302(R), Apr. 2009 (Year: 2009).*
Search Report from counterpart British Application No. 2209254.8 dated Nov. 25, 2022, 3 pp.

* cited by examiner

SYSTEM FOR CLOCK SYNCHRONIZATION WITH POLARIZATION ENTANGLED PHOTONS

This application claims the benefit of U.S. Provisional Patent Application No. 63/215,298, filed on Jun. 25, 2021, the entire content of which is incorporated herein by reference.

TECHNICAL FIELD

This disclosure relates to quantum communication and time transfer.

BACKGROUND

Quantum entanglement is a phenomenon that occurs when a group of photons share a quantum state with other photons of the group, even when the photons of the group are separated by a large distance. The quantum state of a group of photons may affect a manner in which a set of light detectors senses the group of photons. Entangled photon pairs can be used to ensure precise timing synchronization between two or more devices. Systems may use the phenomenon of quantum entanglement in order to facilitate secure communication between two or more devices.

SUMMARY

In general, the disclosure is directed to a system for secure synchronization of timing based on polarization of entangled photons. The signature of the entanglement can be used to perform synchronization with an arbitrary offset time difference between the devices, alleviating the need for precise control of the device separation. The system may send quantum signals between a source device and one or more wing devices so that the quantum signals are secure from third party interference. For example, a quantum light device may send one or more photons to a first wing device and send one or more photons to a second wing device. The quantum light device may emit a plurality of pairs of photons, where each pair of photons of the plurality of pairs of photons occupies a quantum entangled state. Each pair of photons may include one photon emitted to the first wing device and one photon emitted to the second wing device. The photons may reflect off of the respective wing device and return to the quantum light device. The light device may include a set of photon detectors which each generate a set of time stamps corresponding to a returning photon. Processing circuitry may analyze the time stamps to determine which pairs of photons were entangled, allowing for time synchronization.

A light source of a quantum light device may emit one or more pairs of photons that occupy quantum entangled states. For example, when the light source splits a single pump photon into a pair of photons, the pair of photons may occupy a quantum entangled state which affects how the pair of photons behave when they travel through optical circuitry. Quantum entangled states may be preserved when the pair of photons are separated by large distances and when the pair of photons are close together. This means that when the light source emits a pair of quantum entangled photons such that a first photon of the pair travels to the first wing device and a second photon of the pair travels to a second wing device that is separated from the first wing device by a distance, the pair of photons may exhibit the quantum entangled state even though the first wing device and the second device are separated by the distance. In cases where both of the first photon and the second photon of the quantum entangled pair of photons return to the quantum light device and travel through optical circuitry to one or more photon detectors, the first photon and the second photon may maintain the same quantum entangled state that the pair of photons occupied when emitted by the light device.

The quantum entangled state of a pair of photons emitted by the light device may affect a manner in which the pair of photons travel through optical circuitry to the one or more photon detectors. Each photon detector of the one or more photon detectors may each emit a series of time signals indicating times at which the respective detector receives a photon. The system may use one or more techniques described herein to calculate a parameter value based on the time signals generated by the one or more photon detectors. When the parameter value is greater than a threshold, this may indicate that a pair of quantum entangled photons emitted by the light source to the wing devices both returned to the quantum light device and traveled through optical circuitry to the one or more light detectors. By calculating the parameter value for all incoming pairs of photons, only those photon pairs emitted at the same time will have the parameter value exceeding the threshold, as photons emitted in separate events are not entangled. The determined simultaneity of events may then be used to synchronize clocks at each device. This may also confirm that communication between the quantum light device and the wing devices is secure.

In calculating the parameter value, the system may account for a difference in a distance between the quantum light device and the first wing device and a distance between the quantum light device and the second wing device. A first photon and a second photon of a pair of quantum entangled photons may both travel at the speed of light. When the pair of quantum entangled photons are emitted by the light device at the same time, the photons might arrive back at the quantum light device at different times when the distance between the quantum light device and the first wing device and the distance between the quantum light device and the second wing device are different. The system may calculate the parameter by taking into account a time delay resulting from the difference in these distances. In some examples, the system may calculate the time of day by analyzing a dependence of the parameter on the time of day considered to be a free variable.

In some examples, a system comprises a quantum light device including a light source configured to emit a plurality of pairs of photons, wherein each pair of photons of the plurality of pairs of photons occupies a quantum entangled state. The quantum light device also includes optical circuitry configured to: receive, from a first wing device, a first set of photons of the plurality of pairs of photons; and receive, from a second wing device, a second set of photons of the plurality of pairs of photons. The quantum light device also includes a set of photon detectors configured to receive the first set of photons and the second set of photons from the optical circuitry, wherein each photon detector of the set of photon detectors is configured to generate a set of time signals, each time signal of the set of time signals representing a time at which the respective photon sensors detects a photon. Additionally, the system includes processing circuitry configured to determine, based on the set of time signals corresponding to each photon detector of the set of photon detectors, whether a time delay value exists in which a Clauser, Home, Shimony and Holt (CHSH) parameter is greater than a threshold CHSH parameter value.

In some examples, a method includes emitting, by a light source of a quantum light device, a plurality of pairs of photons, wherein each pair of photons of the plurality of pairs of photons occupies a quantum entangled state; receiving, by optical circuitry of the quantum light device, a first set of photons of the plurality of pairs of photons from a first wing device; receiving, by the optical circuitry, a second set of photons of the plurality of pairs of photons from a second wing device; and receiving, by a set of photon detectors of the quantum light device, the first set of photons and the second set of photons from the optical circuitry. Additionally, the method includes generating, by each photon detector of the set of photon detectors, a set of time signals, each time signal of the set of time signals representing a time at which the respective photon sensors detects a photon; and determining, by processing circuitry based on the set of time signals corresponding to each photon detector of the set of photon detectors, whether a time delay value exists in which a Clauser, Home, Shimony and Holt (CHSH) parameter is greater than a threshold CHSH parameter value.

In some examples, a non-transitory computer readable medium includes instructions that when executed cause one or more processors to: control a light source of a quantum light device to emit a plurality of pairs of photons, wherein each pair of photons of the plurality of pairs of photons occupies a quantum entangled state; cause optical circuitry of the quantum light device to receive a first set of photons of the plurality of pairs of photons from a first wing device; cause the optical circuitry to receive a second set of photons of the plurality of pairs of photons from a second wing device; cause a set of photon detectors of the quantum light device to receive the first set of photons and the second set of photons from the optical circuitry. Additionally, the instructions cause the one or more processors to cause each photon detector of the set of photon detectors to generate a set of time signals, each time signal of the set of time signals representing a time at which the respective photon sensors detects a photon; and determine, based on the set of time signals corresponding to each photon detector of the set of photon detectors, whether a time delay value exists in which a Clauser, Home, Shimony and Holt (CHSH) parameter is greater than a threshold CHSH parameter value.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

This disclosure describes devices, methods, and techniques for synchronizing timing between devices and analyzing the quantum signals to determine whether the signals are secure. Systems may use quantum signals for direct clock synchronization between moving bodies, and highly sensitive measurements of the distance between objects. In some cases, a system may use quantum entanglement in order to prevent an adversary from replacing one of the nodes of the system and attempting to send false signals. In some examples, a system may measure a time of flight delay of photons in a beam of light so that the relative distance between one or more nodes can be determined. Consequently, the system may be secure against attacks by an adversary, since a central node may detect if an adversary is attempting to attack system.

Figure 1:
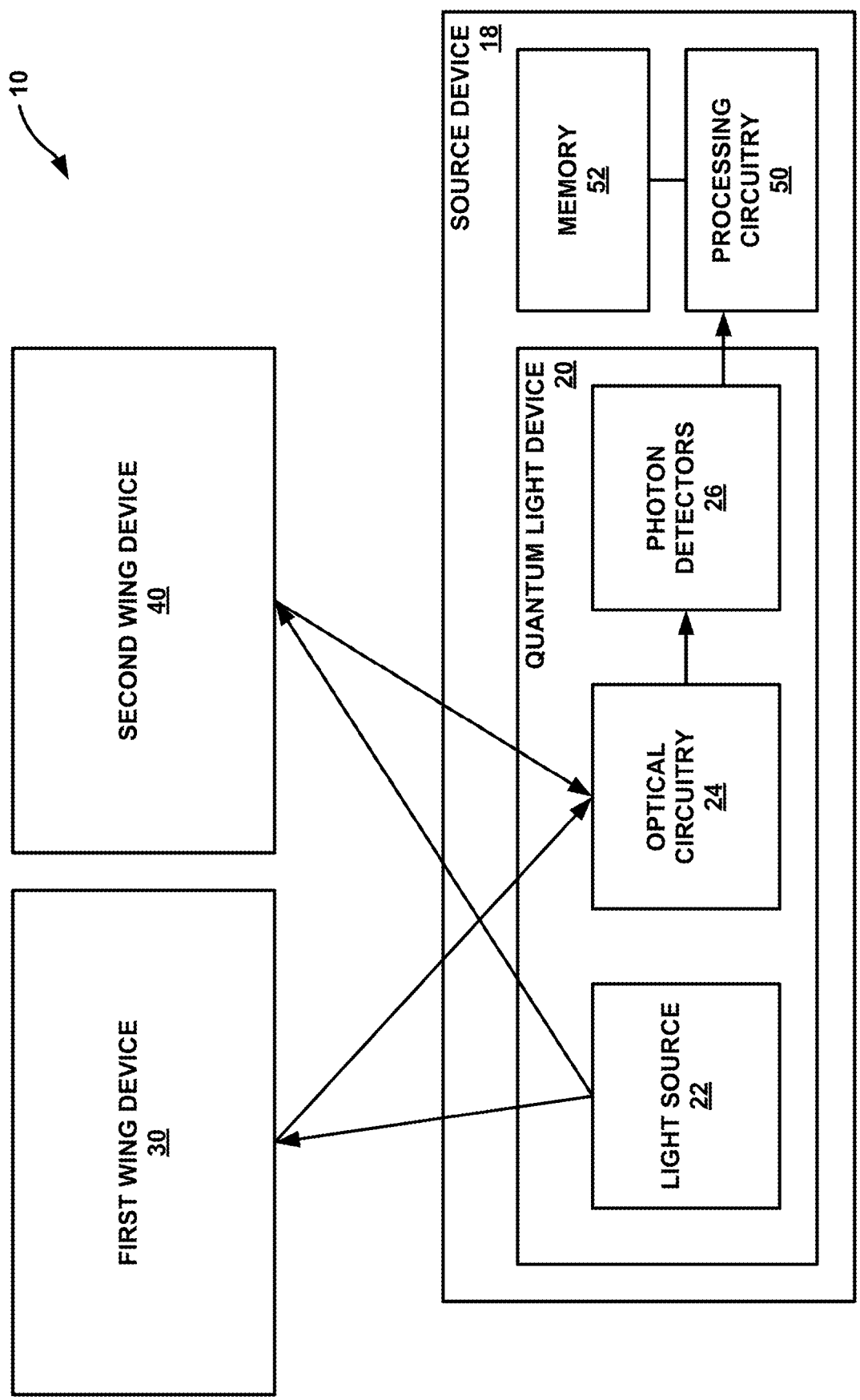
FIG. 1 is a block diagram illustrating a system for secure time synchronization, in accordance with one or more techniques of this disclosure.

FIG. 1 is a block diagram illustrating a system 10 for secure time synchronization, in accordance with one or more techniques of this disclosure. As seen in FIG. 1, the system 10 includes a source device 18, a quantum light device 20, a first wing device 30, a second wing device 40, and processing circuitry 50. Quantum light device 20 includes a light source 22, optical circuitry 24, and photon detectors 26. First wing device 30 and second wing device 40 may, in some cases, be collectively referred to herein as "wing devices 30, 40."

Source device 18 may be configured to perform secure quantum communication. quantum light device 20 and first wing device 30, and source device 18 may be configured to perform secure quantum communication between quantum light device 20 and second wing device 40. For example, quantum light device 20 may emit one or more photons to first wing device 30 and emit one or more photons to second wing device 40, and receive one or more photons from first wing device 30 and/or second wing device 40. Source device 18 may be configured to determine whether one or more received photons were emitted by quantum light device 20 and "bounced" from first wing device 30 and/or second wing device 40. That is, source device 18 may be configured to determine whether one or more received photons completed a round-trip between quantum light device 20 and wing devices 30, 40 without being intercepted by any other devices. This means that quantum light device 20 may determine whether communication between quantum light device 20 and wing devices 30, 40 is secure, or whether communication between quantum light device 20 and wing devices 30, 40 is compromised.

Source device 18 may, in some cases, continue to control quantum light device 20 to communicate with wing devices 30, 40 based on determining that communication between quantum light device 20 and wing devices 30, 40 is secure. When source device 18 determines that communication between quantum light device 20 and wing devices 30, 40 is compromised, source device 18 may perform one or more actions. For example, source device 18 may cause quantum light device 20 to cease communicating with wing devices 30, 40 based on determining that the communication is compromised. Additionally, or alternatively, source device 18 may output one or more messages indicating compromised communication between quantum light device 20 and wing devices 30, 40.

Quantum light device 20 may include a light source 22, optical circuitry 24, and photon detectors 26 as part of the same device. In some examples, quantum light device 20 is located on or within another device, but this is not required. In some examples, quantum light device 20 may be a standalone device. Quantum light device 20 may include light source 22, optical circuitry 24, and photon detectors 26 within a relatively compact area such that a distance between light source 22 and first with device 30 is approximately the same as a distance between optical circuitry 24 and first wing device 30. Additionally, a distance between light source 22 and second wing device 40 may be approximately the same as a difference between optical circuitry 24 and second wing device 40.

Light source 22 is configured to emit a plurality of pairs of photons, wherein each pair of photons of the plurality of pairs of photons occupies a quantum entangled state. Light source 22 may include one or more nonlinear crystals that are configured to split a photon beam into one or more pairs of photons. In some examples, the one or more pairs of photons have an energy that is equal to an energy of the photon beam that is split by the one or more crystals of light source 22. In some examples, the photon beam may include a series of photons, and the one or more crystals may split each photon of the series of photons into a pair of photons, wherein the pair of photons each have lower energy than the photon that is split by the one or more crystals. In some examples, the one or more crystals may include one or more beta-barium borate (BBO) crystals and/or one or more lithium niobate crystals, but this is not required. The one or more crystals of light source 22 may additionally or alternatively include one or more other kinds of crystals. In some examples, the one or more crystals may include nonlinear crystals.

In some examples, light source 22 utilizes a nonlinear optical effect of degenerate spontaneous parametric down conversion (dSPDC) to generate each pair of photons of the plurality of pairs of photons. To generate a pair of photons, light source 22 may emit a pump photon that splits into two "twin" daughter photons that are "born" at nearly the same instant. For example, an amount of time separating a first photon and a second photon of a pair of photons may be less than 100 femtoseconds. In some examples, each pair of twin photons that light source 22 generates from a pump photon includes a signal photon and an idler photon.

In some examples, the light source 22 emits pairs of photons according to a random distribution in time. For example, the light source 22 may emit a first pair of photons and emit a second pair of photons a random amount of time after the light source 22 emits the first pair of photons. The random amount of time may be a random time within a range of times.

In some examples, each pair of photons of the plurality of pairs of photons emitted by light source 22 occupies a respective Bell state of a set of Bell states. Bell states may be quantum states that represent examples of quantum entanglement. Quantum entanglement may represent a phenomenon where two or more photons interact in some what such that a quantum state of each photon of the two or more photons cannot be described independently of a quantum state of each other photon of the two or more photons. When light source 22 splits a single pump photon into a pair of photons, the pair of photons may exhibit quantum entanglement. In some examples, the pair of photons may exhibit quantum entanglement even when the pair of photons are separated by a large distance. This means that when light source 22 emits a pair of photons that are split from the same pump photon, the pair of photons exhibit quantum entanglement even when light source 22 emits the pair of photons to different wing devices 30, 40. When the pair of photons return to source device 18 from wing devices 30, 40, the pair of photons may maintain the same state of quantum entanglement that the photons exhibited when light source 22 emitted them.

A set of possible Bell states that can be occupied by a pair of photons split from the same pump photon may, in some examples, include four different Bell states. One Bell state is $$|\psi_1\rangle = \frac{1}{\sqrt{2}}(|H\rangle|H\rangle + |V\rangle|V\rangle).$$

Other Bell states include $$|\psi_2\rangle = \frac{1}{\sqrt{2}}(|H\rangle|H\rangle - |V\rangle|V\rangle),$$

$$|\psi_3\rangle = \frac{1}{\sqrt{2}}(|H\rangle|V\rangle + |V\rangle|H\rangle),$$

and $$|\psi_4\rangle = \frac{1}{\sqrt{2}}(|H\rangle|V\rangle - |V\rangle|H\rangle).$$

H and V represent horizontal and vertical polarizations, respectively. In some examples, when a photon pair occupies the Bell state $$|\psi_1\rangle = \frac{1}{\sqrt{2}}(|H\rangle|H\rangle + |V\rangle|V\rangle),$$

a first photon may occupy the state $$\frac{1}{\sqrt{2}}(|H\rangle|H\rangle)$$

and a second photon may occupy the state $$\frac{1}{\sqrt{2}}(|V\rangle|V\rangle).$$

In some examples, when a photon pair occupies the Bell state $$|\psi_2\rangle = \frac{1}{\sqrt{2}}(|H\rangle|H\rangle - |V\rangle|V\rangle),$$

a first photon may occupy the state $$\frac{1}{\sqrt{2}}(|H\rangle|H\rangle)$$

and a second photon may occupy the state $$\frac{-1}{\sqrt{2}}(|V\rangle|V\rangle).$$

In some examples, when a photon pair occupies the Bell state $$|\psi_3\rangle = \frac{1}{\sqrt{2}}(|H\rangle|V\rangle + |V\rangle|H\rangle),$$

a first photon may occupy the state $$\frac{1}{\sqrt{2}}(|H\rangle|V\rangle)$$

and a second photon may occupy the state $$\frac{1}{\sqrt{2}}(|V\rangle|H\rangle).$$

In some examples, when a photon pair occupies the Bell state $$|\psi_4\rangle = \frac{1}{\sqrt{2}}(|H\rangle|V\rangle - |V\rangle|H\rangle),$$

a first photon may occupy the state $$\frac{1}{\sqrt{2}}(|H\rangle|V\rangle)$$

and a second photon may occupy the state $$\frac{-1}{\sqrt{2}}(|V\rangle|H\rangle).$$

In some examples, there is a 100% probability that two entangled photons occupy one of the four Bell states.

In some examples, when light source 22 emits each pair of photons of the plurality of pairs of photons, light source 22 may emit a first photon of each pair of photons to the first wing device 30 and light source 22 may emit a second photon of each pair of photons to the second wing device 40. The first photon and the second photon of each pair of photons emitted by the light source 22 may occupy a quantum entangled state (e.g., a Bell state).

The quantum entangled photons of each pair of photons of the plurality of pairs of photons may be used to determine the offset between a first optical pathlength and a second optical pathlength. The first optical pathlength exists between quantum light device 20 and first wing device 30. The second optical pathlength exists between quantum light device 20 and second wing device 40. Quantum light device 20 may determine the path length offset by projecting bi-photons (e.g., the plurality of pairs of photons) from light source 22, reflecting some photons from the first wing device 30 and some photons from the second wing device 40, and recombining one or more of the photons again at the source. In some examples, first wing device 30 may include a first wing device photon detector and second wing device 40 may include a second wing photon detector. The first wing device photon detector and the second wing photon detector may detect some of the photons emitted from the light source 22. As such, the first wing device 30 and the second wing device 40 might not reflect every photon emitted by light source 22.

In some examples, wing devices 30, 40 may represent photon devices that each include one or more mirrors. The one or more mirrors of each of wing devices 30, 40 may reflect one or more photons received by the respective wing device back towards source device 18. In some examples, each of wing devices 30, 40 may include one or more photon detectors that are configured to generate an electrical signal each time that a photon hits the detector. In some examples, the one or more mirrors of each of wing devices 30, 40 may reflect one or more photons received from source device 18 back towards source device 18. In some examples, the one or more photon detectors of each of wing devices 30, 40 may receive one or more photons received from source device 18 without the one or more mirrors of the respective wing device 30, 40 reflecting the photon back to source device 18. This means that not every photon that source device 18 emits to one of wing devices 30, 40 returns to source device 18. But there may be one or more cases where source device 18 emits a first photon of a pair of quantum entangled photons to the first wing device 30, source device 18 emits a second photon of the pair of quantum entangled photons to the second wing device 40, and both of the first photon and the second photon are reflected back to source device 18. In these cases, source device 18 may be configured to identify whether the first photon and the second photon were emitted by source device 18 as parts of the same pair of photons, and source device 18 may be configured to determine whether communication between source device 18 and wing devices 30, 40 is compromised.

In some examples, quantum light device 20 and/or processing circuitry 50 may perform a Bell's state measurement based on one or more photon measurements to determine which pairs of photons returning to quantum light device 20 were emitted by light source 22 in the same pair of photons. In some cases, only a pair of photons that was generated at the same instant will exhibit correlations that violate Bell's inequalities.

For example, optical circuitry 24 may include a set of beam splitters and a set of waveplates. Each photon that arrives at optical circuitry 24 may travel through one or more beam splitters of the set of beam splitters and travel through one or more waveplates of the set of waveplates to arrive at a photon detector of photon detectors 26. Each photon detector of photon detectors 26 may generate an electrical signal every time that a photon hits the respective photon detector. This means that photon detectors 26 may generate, for each photon detector of photon detectors 26, a time plot that indicates every time that the respective photon detector records a photon. Processing circuitry 50 may analyze the time plot corresponding to each photon detector of the set of photon detectors in order to determine whether the time plots indicate any pairs of quantum entangled photons emitted by light source 22.

In some examples, optical circuitry 24 may receive a first set of photons from first wing device 30. In some examples, optical circuitry 24 may receive a second set of photons from second wing device 40. In some examples, the first set of photons may include one or more photons emitted from light source 22 to first wing device 30. In some examples, the second set of photons may include one or more photons emitted from light source 22 to second wing device 40. Light source 22 may emit one or more pairs of photons, emitting a first photon of each pair of photons to first wing device 30 and emitting a second photon of each pair of photons to second wing device 40. In some examples, a distance between source device 18 and the first wing device 30 is different from a distance between source device 18 and second wing device 40. This means that when source device 18 emits a pair of photons to wing devices 30, 40, and the pair of photons returns to source device 18, the photon of the pair of photons which source device 18 emits to the wing device that is closer to source device 18 may return to source device 18 before the photon of the pair of photons which source device 18 emits to the wing device that is farther from source device 18.

Since source device 18 may emit a pair of photons to wing devices 30, 40 at the same time, but the pair of photons do not necessarily return to source device 18 at the same time, source device 18 may use one or more techniques described herein to identify pairs of photons returning to source device 18 that were emitted by source device 18 at the same time when light source 22 splits a pump photon. For example, optical circuitry 24 may direct photons received by quantum light device 20 to photon detectors 26. Photon detectors 26 may, in some examples, include four photon detectors. Optical circuitry 24 may include a set of beam splitters and a set of waveplates. In some examples, the set of beam splitters and the set of waveplates may direct each photon arriving at optical circuitry 24 to one photon detector of photon detectors 26.

In some examples, photon detectors 26 are configured to detect a time at which each photon of a plurality of photons arriving at optical circuitry 24 arrives at a respective photon detector of photon detectors 26. For example, a first photon detector of photon detectors 26 may output a first set of time signals, wherein each time signal of the first set of time signals corresponds to a time in which the first photon detector receives a photon. A second photon detector of photon detectors 26 may output a second set of time signals, wherein each time signal of the second set of time signals corresponds to a time in which the second photon detector receives a photon. A third photon detector of photon detectors 26 may output a third set of time signals, wherein each time signal of the third set of time signals corresponds to a time in which the third photon detector receives a photon. A fourth photon detector of photon detectors 26 may output a fourth set of time signals, wherein each time signal of the fourth set of time signals corresponds to a time in which the fourth photon detector receives a photon. This means that in one example, the photon detectors 26 may generate four sets of time signals, each set of time signals corresponding to one of the set of four photon detectors. This disclosure is not limited to photon detectors 26 having four photon detectors. In some examples, photon detectors 26 may have more than four photon detectors or less than four photon detectors.

Processing circuitry 50 may, in some examples, may include one or more processors that are configured to implement functionality and/or process instructions for execution within system 10. Processing circuitry 50 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 50 may include any suitable structure, whether in hardware, software, firmware, or any combination thereof, to perform the functions ascribed herein to processing circuitry 50.

Memory 52 may be configured to store information within system 10 during operation. The memory may include a computer-readable storage medium or computer-readable storage device. In some examples, the memory includes one or both of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 50.

Processing circuitry 50 may, in some examples, receive one or more sets of time signals from the photon detectors 26. In some examples, processing circuitry 50 may identify, based on the one or more sets of time signals received from photon detectors 26, one or more pairs of photons, each pair of photons of the one or more pairs of photons being emitted by the light source 22 at the same time when light source 22 splits a pump photon into the respective pair of photons. In some examples, processing circuitry 50 identifies the one or more pairs of photons by analyzing the one or more sets of time signals. For example, processing circuitry 50 may determine, based on the one or more sets of time signals, whether a time delay value between two time signals of the one or more sets of time signals exists in which a Clauser, Home, Shimony and Holt (CHSH) parameter is greater than a threshold CHSH parameter value. When a time delay value between two time signals of the one or more sets of time signals exists in which a CHSH parameter is greater than a threshold CHSH parameter value, the two photons corresponding to the two time signals may represent a pair of photons emitted by light source 22 when light source 22 splits a pump photon. Processing circuitry 50 may identify one or more pairs of time signals having a time delay value corresponding to a CHSH parameter greater than a threshold CHSH parameter value.

In some examples, a time delay value corresponding to pair of photons emitted by light source 22 at the same time and sent to wing devices 30, 40 may depend on a first distance between quantum light device 20 and first wing device 30 and a second distance between quantum light device 20 and second wing device 40. The first distance and the second distance may determine a time it takes for a first photon of a pair of photons to travel from light source 22 to first wing device 30 and return to quantum light device 20, and determine a time it takes for a second photon of a pair of photons to travel from light source 22 to second wing device 30 and return to quantum light device 20. For example, if the second distance is longer than the first distance, it may take more time for the second photon to travel from light source 22 to second wing device 40 and return to quantum light device 20 than it takes for the first photon to travel from light source 22 to first wing device 30 and return to quantum light device 20. This means that a pair of photons emitted by light source 22 at the same time may return to quantum light device 20 at different times, with the time delay between the photons depending on the respective distances between the quantum light device and each of wing devices 30, 40.

Processing circuitry 50 may determine a correlation parameter for all incoming pairs of photons within a range of expected values of time delay. In some cases, only pairs of photons that were emitted at the same time by light source 22 will exhibit entanglement. This means that a time-delay that must be applied is determined by what time delay leads to the largest correlations between incoming photon pairs. When a time delay is established from the entangled photon pairs, pairs of events registered to the wing device photon detectors 66 and 69 may be identified and used as part of a protocol to synchronize independent clocks at the two wing locations.

In some examples, processing circuitry 50 is configured to determine a first correlation parameter corresponding to a correlation between a first photon detector of photon detectors 26 and a third photon detector of photon detectors 26. In some examples, processing circuitry 50 is configured to determine a second correlation parameter corresponding to a correlation between the first photon detector and a fourth photon detector of photon detectors 26. In some examples, processing circuitry 50 may determine a third correlation parameter corresponding to a correlation between a second photon detector of photon detectors 26 and a third photon detector of photon detectors 26. In some examples, processing circuitry 50 may determine a fourth correlation parameter corresponding to a correlation between the second photon detector and the fourth photon detector. In some examples, processing circuitry 50 may calculate a sum of the first correlation parameter, the second correlation parameter, the third correlation parameter, and the fourth correlation parameter to determine a CHSH parameter for a pair of time signals separated by an expected time delay corresponding to the distance between quantum light device 20 and first wing device 30 and the distance between quantum light device 20 and first wing device 40.

In some examples, processing circuitry 50 may determine that a pair of time signals correspond to a quantum entangled photon pair emitted by light source 20 when the CHSH parameter for the pair of time signals is greater than a threshold CHSH parameter value. In some examples, the threshold CHSH parameter is a constant number value (e.g., 2). In some cases, it may be impossible for a pair of time signals to have a CHSH parameter value greater than the threshold CHSH parameter value when the pair of time signals correspond to photons that are not quantum entangled (e.g., the pair of photons were not emitted at the same time by splitting a pump photon).

Figure 2:
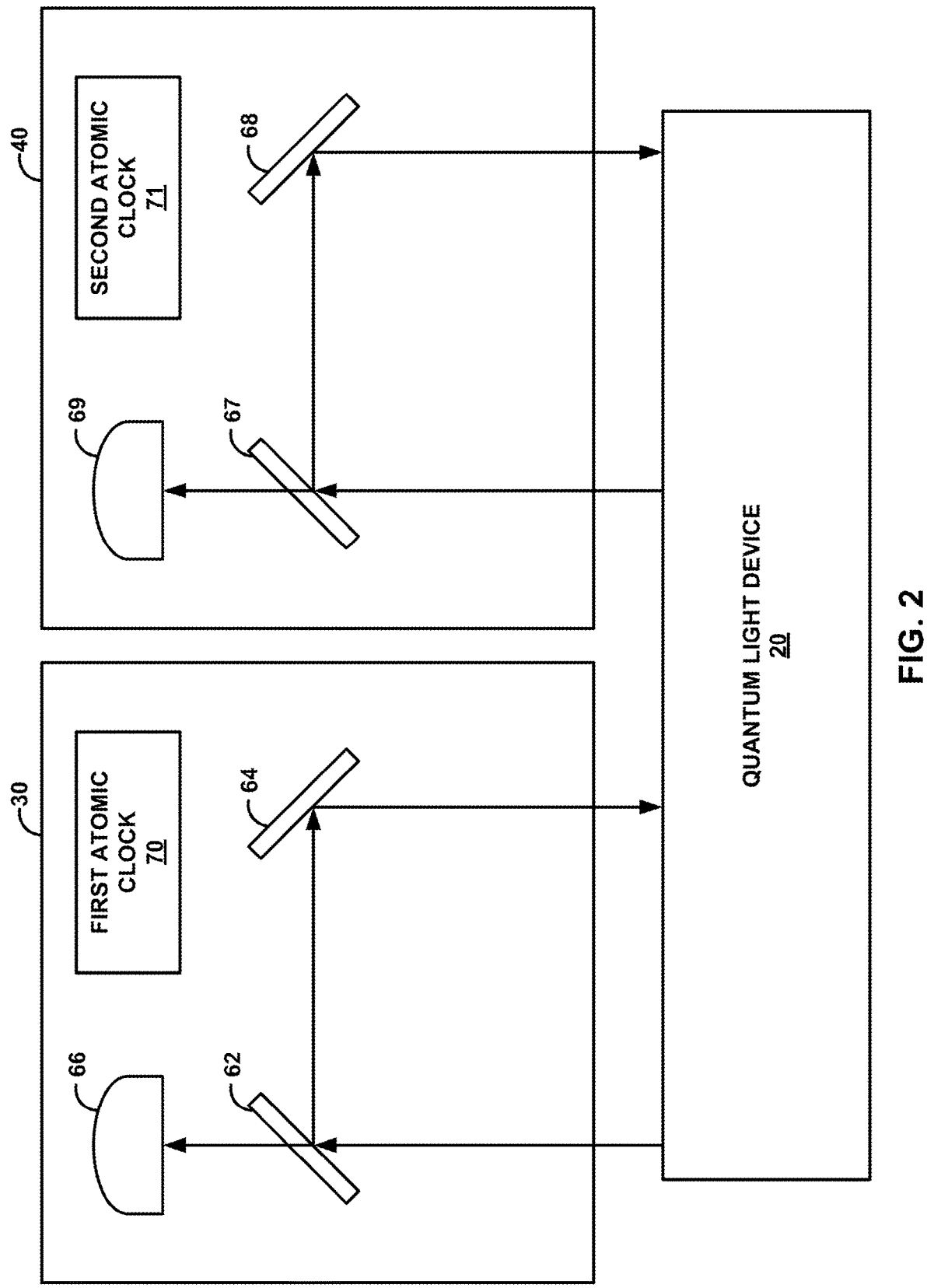
FIG. 2 is a conceptual diagram illustrating components of the first wing device and the second wing device of FIG. 1, in accordance with one or more techniques of this disclosure.

FIG. 2 is a conceptual diagram illustrating components of the first wing device 30 and the second wing device 40 of FIG. 1, in accordance with one or more techniques of this disclosure. As seen in FIG. 2, the first wing device 30 may include a first mirror 62, a second mirror 64, a first wing device photon detector 66, and a first atomic clock 70. Second wing device 40 may include a third mirror 67, a fourth mirror 68, a second wing device photon detector 69, and a second atomic clock 71.

First wing device 30 may receive one or more photons from quantum light device 20. In some examples, each photon of the one or more photons received from quantum light device 20 may represent one photon of a photon pair emitted by light source 22. In some examples, each photon of the one or more photons received by first wing device 30 from quantum light device 20 is quantum entangled with another photon of the respective photon pair, where both photons of the respective photon pair are emitted by quantum light device 20 at substantially the same time. In some examples, the other photon corresponding to each photon of the one or more photons received by wing device 30 from quantum light device 20 is received by second wing device 40. Each photon received by first wing device 30 from quantum light device 20 may travel through first wing device 30 until the photon reaches first mirror 62.

The first mirror 62 may represent a partially reflective mirror. A partially reflective mirror may, in some examples, reflect one or more photons from a first surface of the mirror and allow one or more photons to pass through the mirror such that the photon crosses the first surface of the mirror, passes through the mirror, and exits the mirror through a second surface of the mirror. For example, at least one photon of the one or more photons received from quantum light device 20 may pass through the first mirror 62 to the first wing device photon detector 66, and at least one photon of the one or more photons received from quantum light device 20 may reflect off the first mirror 62 towards the second mirror 64. The first mirror 62 may have a reflectively coefficient that determines a percentage of the one or more photons received by first wing device 30 that are reflected from first mirror 62 and a percentage of the one or more photons received by first wing device 30 that pass through first mirror 62. In some examples, the reflectivity coefficient of first mirror 62 may be relatively high such that over half of the one or more photons received by first wing device 30 are reflected to the second mirror 64.

The second mirror 64 may be fully reflective so that every photon that hits the second mirror 64 from the first mirror 62 may reflect off the second mirror 64. In some examples, each photon that reflects from the second mirror 64 may exit first wing device 30 towards the quantum light device 20. In some examples, first wing device 30 reflects more than half of the one or more photons received from the quantum light device 20 back to the quantum light device 20. A time-delay of a photons returning to the quantum light device 20 from the first wing device 30 may depend on a distance between the quantum light device 20 and the first wing device 30.

Photon detector 66 may, in some examples, include a single photon detector (SPD) that is configured to emit a time signal every time that a photon arrives at photon detector 66. In some examples, the time signals emitted by photon detector 66 may be electrical signals. Processing circuitry of first wing device 30 (not illustrated in FIG. 2) may be configured to receive each time signal emitted by photon detector 66 and generate a time stamp record that records each time that a photon arrives at photon detector 66. In some examples, first mirror 62 may reflect more than half of the photons arriving at first wing device 30, meaning that less than half of the photons arriving at wing device 30 from quantum light device 20 pass through first mirror 62 to photon detector 66.

Second wing device 40 may receive one or more photons from quantum light device 20. In some examples, each photon of the one or more photons received by second wing device 40 from quantum light device 20 may represent one photon of a photon pair emitted by light source 22. In some examples, each photon of the one or more photons received by second wing device 40 from quantum light device 20 is quantum entangled with another photon of the respective photon pair, where both photons of the respective photon pair are emitted by quantum light device 20 at substantially the same time. In some examples, the other photon corresponding to each photon of the one or more photons received by second wing device 40 from quantum light device 20 is received by second wing device 40. Each photon received by second wing device 40 from quantum light device 20 may travel through second wing device 40 until the photon reaches third mirror 67.

The third mirror 67 may represent a partially reflective mirror. A partially reflective mirror may, in some examples, reflect one or more photons from a first surface of the mirror and allow one or more photons to pass through the mirror such that the photon crosses the first surface of the mirror, passes through the mirror, and exits the mirror through a second surface of the mirror. For example, at least one photon of the one or more photons received from quantum light device 20 may pass through the third mirror 67 to the first wing device photon detector 69, and at least one photon of the one or more photons received from quantum light device 20 may reflect off the third mirror 67 towards the fourth mirror 68. The third mirror 67 may have a reflectively coefficient that determines a percentage of the one or more photons received by second wing device 40 that are reflected from third mirror 67 and a percentage of the one or more photons received by second wing device 40 that pass through third mirror 67. In some examples, the reflectivity coefficient of third mirror 67 may be relatively high such that over half of the one or more photons received by second wing device 40 are reflected to the fourth mirror 68.

The fourth mirror 68 may be fully reflective so that every photon that hits the fourth mirror 68 from the third mirror 67 may reflect off the fourth mirror 68. In some examples, each photon that reflects from the fourth mirror 68 may exit second wing device 40 towards the quantum light device 20. In some examples, second wing device 40 reflects more than half of the one or more photons received from the quantum light device 20 back to the quantum light device 20. A time-delay of a photons returning to the quantum light device 20 from the second wing device 40 may depend on a distance between the quantum light device 20 and the second wing device 40.

Photon detector 69 may, in some examples, include an SPD that is configured to emit a time signal every time that a photon arrives at photon detector 69. In some examples, the time signals emitted by photon detector 69 may be electrical signals. Processing circuitry of second wing device 40 (not illustrated in FIG. 2) may be configured to receive each time signal emitted by photon detector 69 and generate a time stamp record that records each time that a photon arrives at photon detector 69. In some examples, third mirror 67 may reflect more than half of the photons arriving at second wing device 40, meaning that less than half of the photons arriving at second wing device 40 from quantum light device 20 pass through third mirror 67 to photon detector 69.

In some examples, first wing device 30 may include a first atomic clock 70 and second wing device 40 may include a second atomic clock 71. It may be beneficial, in some cases, to synchronize the first atomic clock 70 and the second atomic clock 71 such that both of the first atomic clock 70 and the second atomic clock 70 indicate substantially the same time.

In some examples, first wing device 30 and second wing device 40 may synchronize the first atomic clock 70 and the second atomic clock 71 by comparing a first time stamp record generated by photon detector 66 and a second time stamp record generated by photon detector 69. Photon detector 66 may generate the first time stamp record to record each time that a photon hits photon detector 66. Photon detector 69 may generate the second time stamp record to record each time that a photon hits photon detector 69. In some examples, first wing device 30 and/or second wing device 40 may receive, from quantum device 20, a time delay between a first photon of a quantum entangled pair returning to the quantum light device 20 from the first wing device 30 and a second photon of a quantum entangled pair returning to quantum light device 20 from second wing device 40. First wing device 30 and/or second wing device 40 may use the time delay received from quantum light device 20 to synchronize atomic clocks 70, 71, accounting for a difference between a time it takes for a photon to travel between quantum light device 20 and first wing devices 30 and a time it takes for a photon to travel between quantum light device 20 and second wing device 40.

In some examples, quantum light device 20 may emit one or more pairs of photons, where one photon of each pair is emitted to first wing device 30 and one photon of each pair is emitted to second wing device 40. Since some photons emitted to first wing device 30 pass through first mirror 62 and are not reflected back to quantum light device 20, and since some photons emitted to second wing device 40 pass through third mirror 67 and are not reflected back to quantum light device 20, not every pair of photons emitted by quantum light device 20 return to quantum light device 20. But there may be one or more occurrences where quantum light device 20 emits a pair of photons including a first photon emitted to first wing device 30 and a second photon emitted to second wing device 40, and both of the first photon and the second photon return to quantum light device 20. Although FIG. 1 and FIG. 2 illustrate two wing devices, the techniques of this disclosure are not limited to systems with two wing devices. The techniques described herein may be used to synchronize clocks of more than two wing devices.

Figure 3:
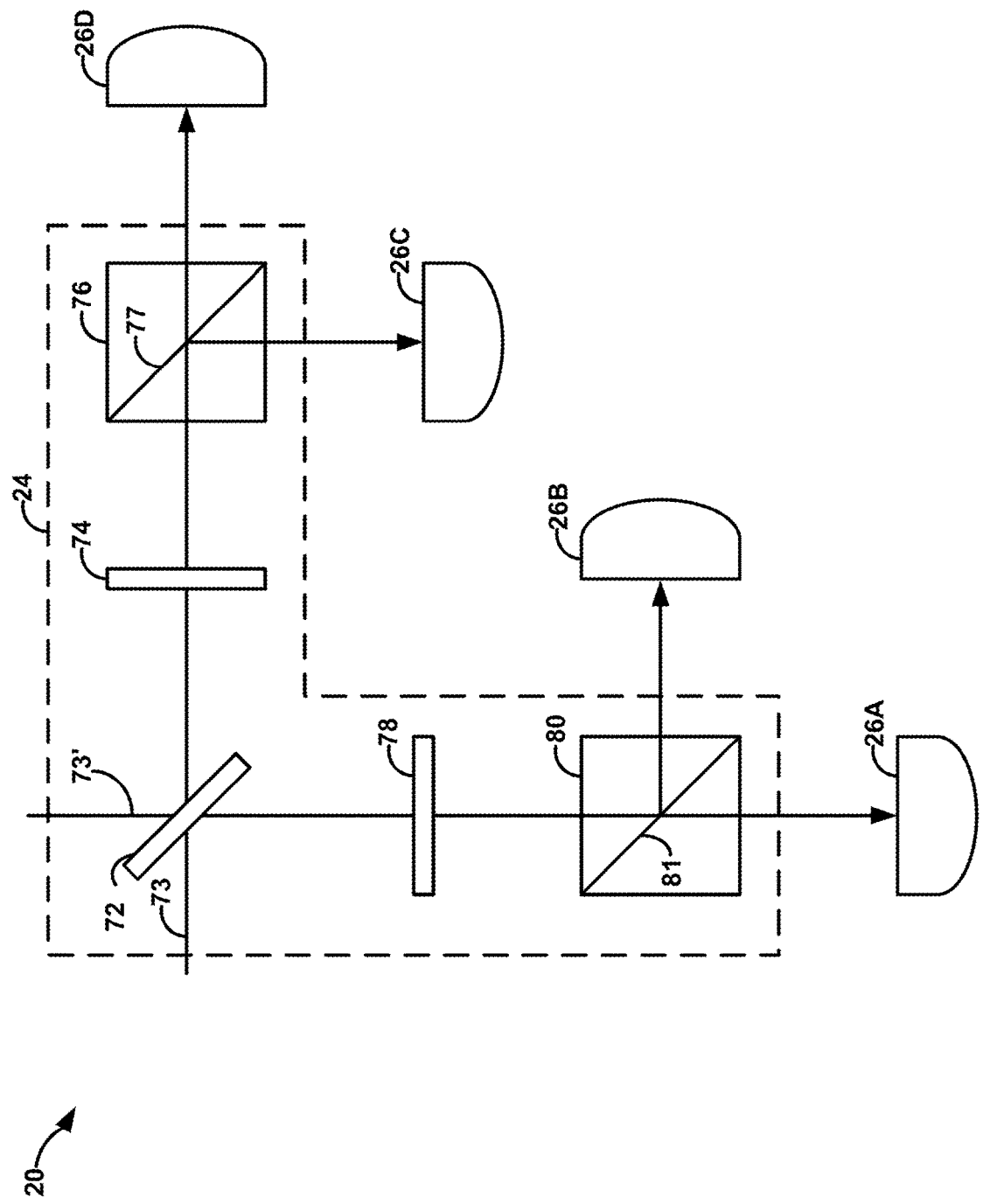
FIG. 3 is a conceptual diagram illustrating one or more components of the quantum light device of FIG. 1, in accordance with one or more techniques of this disclosure.

FIG. 3 is a conceptual diagram illustrating one or more components of the quantum light device 20 of FIG. 1, in accordance with one or more techniques of this disclosure. As seen in FIG. 3, quantum light device 20 includes optical circuitry 24 and photon detectors 26A-26D (collectively, "photon detectors 26"). Quantum light device 20 may further include light source 22, although light source 22 is not illustrated in FIG. 3. Optical circuitry 24 includes first beam splitter 72, first waveplate 74, second beam splitter 76, second wave plate 78, and third beam splitter 80.

In some examples, first beam splitter 72 is a non-polarizing beam splitter. For example, first beam splitter 72 may pass or deflect a photon regardless of the photon's polarization. First beam splitter 72 may receive one or more photons returning from first wing device 30 and one or more photons returning from second wing device 40. In some examples, first beam splitter 72 may direct roughly half of the photons arriving at first beam splitter 72 to the first waveplate 74 and first beam splitter 72 may direct roughly half of the photons arriving at first beam splitter 72 to the second waveplate 78.

In some examples, photons arriving at optical circuitry 24 from first wing device 30 may arrive via a first channel 73, and photons arriving at optical circuitry 24 from second wing device 40 may arrive via a second channel 73'. Photons arriving via the first channel 73 may make contact with a first surface of first beam splitter 72, and photons arriving via the second channel 73' may make contact with a second surface of first beam splitter 72. In some cases, one or more photons arriving at beam splitter 72 via first channel 73 may pass through beam splitter 72 to first waveplate 74, and one or more photons arriving at beam splitter 72 via first channel 73 may reflect from the first surface of beam splitter 72 towards second waveplate 78. In some cases, one or more photons arriving at beam splitter 72 via second channel 73' may pass through beam splitter 72 to second waveplate 78, and one or more photons arriving at beam splitter 72 via first channel 73' may reflect from the second surface of beam splitter 72 towards first waveplate 74.

In some examples, the first waveplate 74 may represent a polarizing waveplate that is configured to polarize passing photons according to a first predetermined angle. For example, each photon arriving at first waveplate 74 may include a polarization angle, and first waveplate 74 may alter the polarization angle of each arriving photon by the predetermined angle. In some examples, the second waveplate 78 may represent a polarizing waveplate that is configured to polarize passing photons according to a second predetermined angle. For example, each photon arriving at second waveplate 78 may include a polarization angle, and second waveplate 78 may alter the polarization angle of each arriving photon by the second predetermined angle. In some examples, the first predetermined angle may be the same as the second predetermined angle, but this is not required. In some examples, the first predetermined angle is different than the second predetermined angle. In some examples, the first waveplate 74 and/or the second waveplate 78 may represent $\lambda/2$ waveplates.

In some examples, the second beam splitter 76 may represent a polarizing beam splitter. For example, the second beam splitter 76 may include a first rectangular prism that is fixed to a second rectangular prism at boundary 77. One or more photons arriving at the second beam splitter 76 from the first waveplate 74 may travel across the boundary 77 through the first rectangular prism and the second rectangular prism towards the photon detector 26D. One or more photons arriving at the second beam splitter 76 from the first waveplate 74 may travel through the first rectangular prism and reflect from the boundary 77 towards the photon detector 26C.

In some examples, the third beam splitter 80 may represent a polarizing beam splitter. For example, the third beam splitter 80 may include a first rectangular prism that is fixed to a second rectangular prism at boundary 81. One or more photons arriving at the third beam splitter 80 from the second waveplate 78 may travel across the boundary 81 through the first rectangular prism and the second rectangular prism towards the photon detector 26A. One or more photons arriving at the third beam splitter 80 from the second waveplate 70 may travel through the first rectangular prism and reflect from the boundary 81 towards the photon detector 26B.

Polarizing beam splitters, such as second beam splitter 76 and third beam splitter 80, may be configured to "pass" photons having one or more polarization angles and "reflect" photons having one or more polarization angles. For example, photons polarized to be parallel or perpendicular to the polarizing beam splitter surface may either pass or reflect from the surface. Photons with polarization along an intermediate axis may have some probability to be reflected and some probability to be transmitted.

Entangled photon pairs (e.g., lip)) emitted by light source 22 may enter into a Bell state measurement entangled, so correlations between pairs of photon detectors 26 may exist due to the entangled state of one or more photon pairs emitted by light source 22 and received by optical circuitry 24. In some examples, one or more correlations between pairs of photon detectors 26 may be impossible to achieve by photons from two different sources (e.g., pairs of photons that are not quantum entangled). In some examples, each photon detector of the set of photon detectors 26 is configured to output a time signal when a photon arrives at the respective detector 26. Processing circuitry 50 may calculate, based on one or more sets of time signals received from photon detectors 26, a correlation E (x, y) for one or more pairs of photon detectors of photon detectors 26. Processing circuitry 50 may calculate an S-parameter based on one or more photon detector correlations. In some examples, the S-parameter may represent a CHSH parameter value.

In some examples, an S-parameter represents a measure of one or more correlations of pairs of photon detectors 26. In some examples, the S-parameter is defined as: S=E(a, c)−E(a, d)+E(b, c)+E(b, d). The E(x, y) are the correlations between respective pairs of the photon detectors 26. For example, E(a, c) is a correlation between photon detector 26A and photon detector 26C, E(a, d) is a correlation between photon detector 26A and photon detector 26D, E(b, c) is a correlation between photon detector 26B and photon detector 26C, and E(b, d) is a correlation between photon detector 26B and photon detector 26D. A correlation between two photon detectors may represent a probability of photons to be found in two specific detectors at the same time. For example, a photon detector may assign the value (1) whenever a photon is detected at a detector, a photon detector may assign the value (0) when the detector does not register a photon. The correlation between two photon detectors may be determined using the equation E(x, y)=P(0,0)−E(1,0)+E(0,1)+E(1,1). Processing circuitry 50 may calculate the probabilities P(0,0), E(1,0), E(0,1), and E(1,1) as probabilities over many photon collection events.

In some examples, the S-parameter value might take into account a time delay corresponding to a difference between a distance from the quantum light device 20 to the first wing device 30 and a distance from the quantum light device 20 to the second wing device 40. Since light source 22 emits one photon of each pair of entangled photons to first wing device 30, and emits another photon of each pair of entangled photons to second wing device 40. Since there may be a difference between the distance from the quantum light device 20 to the first wing device 30 and the distance from the quantum light device 20 to the second wing device 40, two entangled photons emitted by light source 22 at the same time might not return to quantum light device 20 at the same time. Processing circuitry 50 may, in some cases, calculate S-parameter values by first factoring in the expected time delay. For example, E (x, y) might measure a probability that two photons arrive at the two respective photon detectors separated by the expected time delay.

In some examples, processing circuitry 50 may calculate E (x, y) for every pair of photon detectors of photon detectors 26. Processing circuitry 50 may calculate an S-parameter value based on the E(x, y) values corresponding to each respective pair of photon detectors of photon detectors 26. In some cases, it may be impossible for a pair of classical photons arriving at photon detectors 26 to result in processing circuitry 50 calculating an S-parameter greater than a threshold S-parameter value.

In some examples, there is a maximum possible value for the S-parameter. For example, the maximum possible value for the S-parameter value may be $2\sqrt{2}$. In some examples, the maximum possible S-parameter value may only be achieved when quantum light device 20 receives quantum entangled photons. Quantum entangled photons arriving at quantum light device 20 may, in some examples, may cause processing circuitry 50 to calculate an S-parameter value greater than the threshold S-parameter value but less than the maximum possible value for the S-parameter. For example, entangled photons may cause processing circuitry 50 to calculate an S-parameter greater than 2. In some examples, loss or extra time signals from dark counts may lower an-S parameter value resulting from one or more quantum entangled states. But pairs of photons that are not quantum entangled may, in some cases, be incapable of causing processing circuitry 50 to calculate an S-parameter value greater than the threshold S-parameter value.

Figure 4:
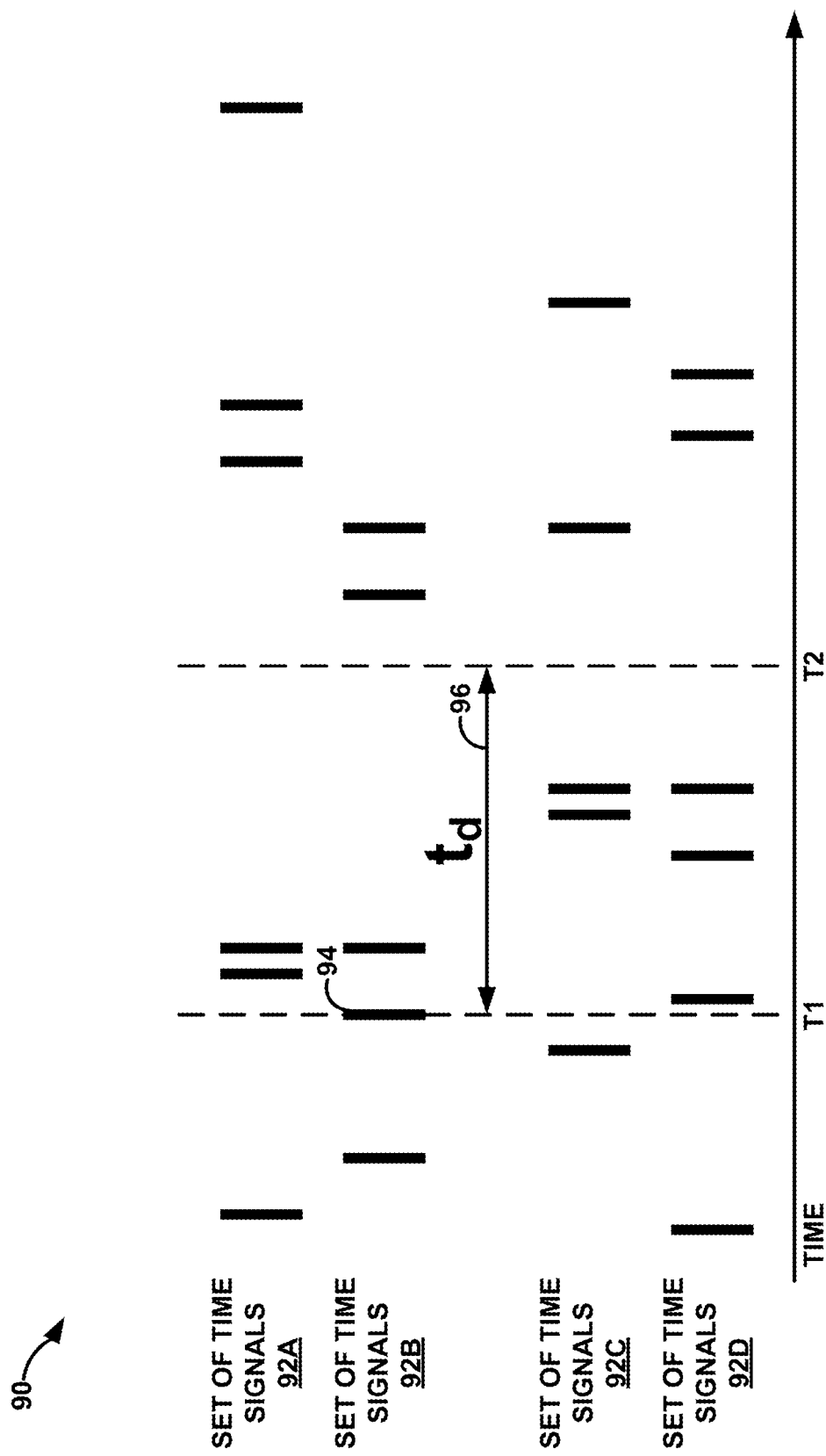
FIG. 4 is a conceptual diagram illustrating a time diagram 90 including time diagram plot corresponding to each photon detector of photon detectors of FIG. 1, in accordance with one or more techniques of this disclosure.

FIG. 4 is a conceptual diagram illustrating a time diagram 90 including time diagram plot corresponding to each photon detector of photon detectors 26 of FIG. 1, in accordance with one or more techniques of this disclosure. Time diagram plot 90 includes sets of time signals 92A-92D (collectively, "sets of time signals 92").

In some examples, photon detector 26A may generate the set of time signals 92A, photon detector 26B may generate the set of time signals 92B, photon detector 26C may generate the set of time signals 92C, and photon detector 26D may generate the set of time signals 92D. For example, photon detector 26A may generate a time signal of the set of time signals 92A each time that photon detector 26A detects a photon, photon detector 26B may generate a time signal of the set of time signals 92B each time that photon detector 26B detects a photon, photon detector 26C may generate a time signal of the set of time signals 92C each time that photon detector 26C detects a photon, and photon detector 26D may generate a time signal of the set of time signals 92D each time that photon detector 26D detects a photon.

In one example, photon detector 26B may generate time signal 94 when photon detector 26B senses a photon at time T1. In order to account for the varying time delay resulting from wing devices 30, 40 being different distances from the quantum light device 20, processing circuitry 50 may add a time delay ($t_d$) 96 to the time T1. In some examples, the time delay may represent a difference between an expected amount of time that it takes for a photon to make a round trip between quantum light device 20 and first wing device 30 and an amount of time that it takes for a photon to make a round trip between quantum light device 20 and second wing device 40. Time delay 96 may extend from time T1 to time T2. In some examples, time delay T1 is added between the photon detectors 26A, 26B, and photon detectors 26C, 26D, as seen in FIG. 4. In other words, if a first photon of a quantum entangled pair of photons arrives at photon detector 26A or photon detector 26B, a second photon of the entangled pair of photons might be expected to arrive at photon detector 26C or photon detector 26D at time T2, where T1 and T2 are separated by expected time delay 96. Or, the first photon of a quantum entangled pair could arrive at photon detector 26C or photon detector 26D at time T1, and a second photon of the entangled pair of photons might be expected to arrive at detector 26A or photon detector 26B at time T2, where T1 and T2 are separate by expected time delay 96.

The photon detectors 26 may emit signals in sequences according to when photons arrive at respective photon detectors. Processing circuitry 50 may calculate an S-parameter based on averaging the correlations for one or more time delay values. For example, the system may measure the S-parameter for one or more different angles corresponding to photon detectors 26. In some examples, the angle of photon detectors 96 may be changed by rotating first waveplate 74 and the second waveplate 78. Rotating first waveplate 74 may affect whether polarizing beam splitter 76 directs one or more photons to photon detector 26C or photon detector 26D. Rotating second waveplate 78 may affect whether polarizing beam splitter 80 directs one or more photons to photon detector 26A or photon detector 26B.

In some examples, the processing circuitry 50 may determine an S-parameter for one or more time delay values. A time delay value which results in the highest S-parameter may represent a true time delay corresponding to a distance between quantum light device 20 and first wing device 30 and a distance between quantum light device 20 and second wing device 40. In some examples the maximum S-parameter is $2\sqrt{2}$. Distances between the wings (e.g., first wing device 30 and second wing device 40, and the source (e.g., quantum light device 20) may determine the $t_d$ which has the highest S parameter, because only photons that were emitted at the exact same instant, e.g., the entangled pair, will exhibit quantum correlations.

In some embodiments, the retro-reflecting optics on each wing device is only partially reflecting, such that some of the down-converted photons pass through to be detected, and time-stamped, locally, to be used for atomic clock synchronization.

In some examples, system 10 has advantages over other methods of establishing the time of flight delay between the source and the two wings, because measuring the quantum correlations allows the user to identify if there has been any interception or manipulation of the photons used in the protocol. When an adversary attempts to intercept photons for the purposes of eavesdropping on the protocol, or to send new pulses back for the purposes of spoofing the protocol, the photons may not exhibit the correct quantum correlations.

Figure 5:
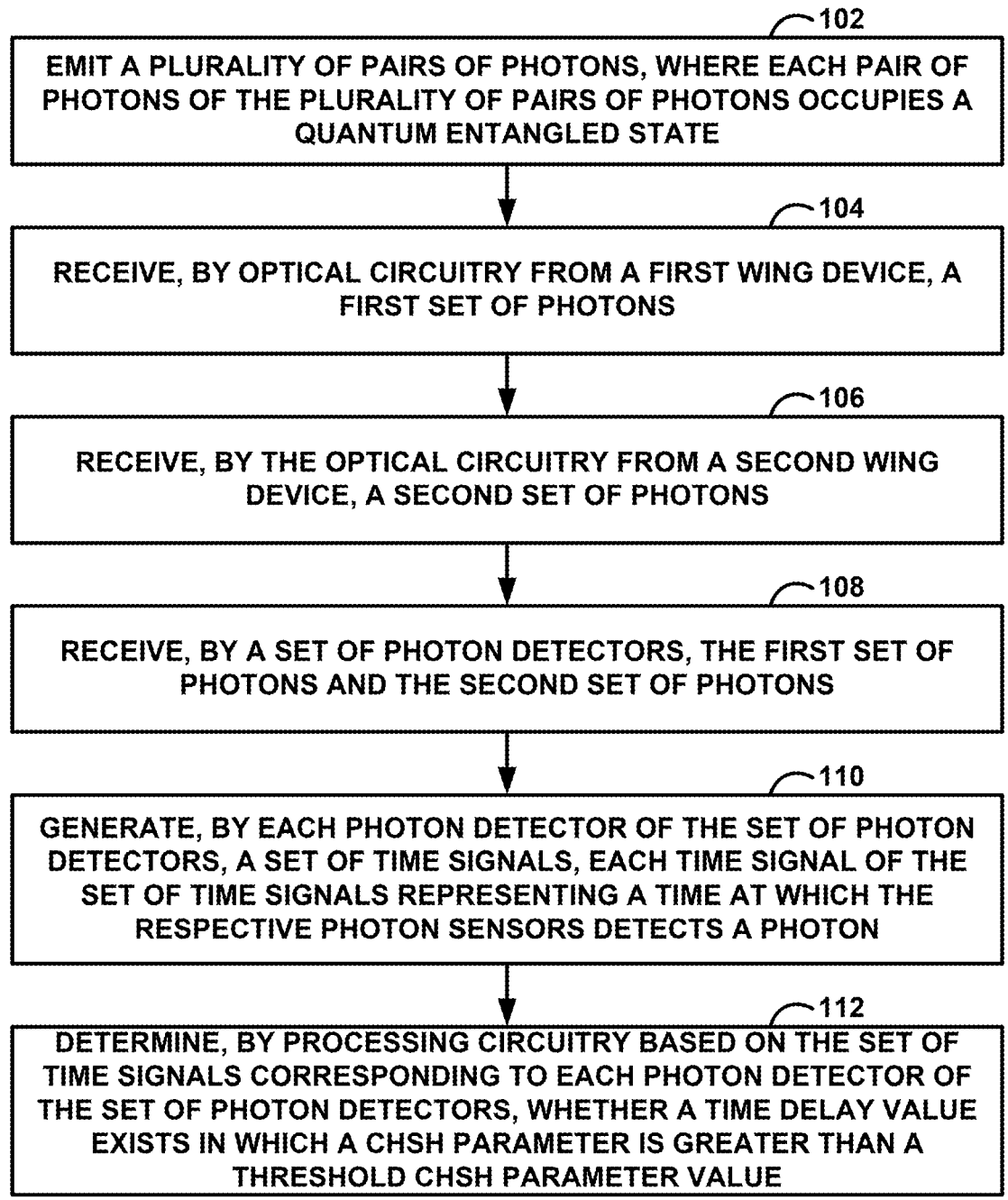
FIG. 5 is a flow diagram illustrating an example operation for determining whether time transfer is secure, in accordance with one or more techniques of this disclosure.

FIG. 5 is a flow diagram illustrating an example operation for determining whether quantum time transfer is secure, in accordance with one or more techniques of this disclosure. FIG. 5 is described with respect to system 10, of FIG. 1. However, the techniques of FIG. 5 may be performed by different components of system 10 or by additional or alternative devices.

Light source 22 of quantum light device 20 may emit a plurality of pairs of photons, where each pair of photons of the plurality of pairs of photons occupies a quantum entangled state (102). In some examples, to emit the plurality of pairs of photons, light source 22 may emit one photon of each pair of photons of the plurality of pairs of photons to the first wing device 30, and light source 22 may emit one photon of each pair of photons of the plurality of pairs of photons to the second wing device 40. In some examples, the quantum entangled state comprises a Bell state of a set of Bell states. Light source 22 may emit each pair of photons of the plurality of photons by splitting a pump photon having a higher energy than each of the respective pair of quantum entangled photons.

Optical circuitry 24 of quantum light device 20 may receive a first set of photons from first wing device 30 (104). Additionally, or alternatively, optical circuitry 24 may receive a second set of photons from second wing device 40 (106). In some examples, the first set of photons and the second set of photons may represent photons of the plurality of pairs of photons emitted to the first wing device 30 and the second wing device 40. That is, the first set of photons may include one or more photons emitted by light device 22 to the first wing device 30, and which return to quantum light device 20, and the second set of photons may include one or more photons emitted by light device 22 to the second wing device 40, and which return to quantum light device 20. In some examples, one or more of the plurality of pairs of photons may include a first photon that is emitted to first wing device 30 and returns to quantum light device 20 and a second photon that is emitted to second wing device 40 and returns to quantum light device 20. A first distance between quantum light device 20 and the first wing device 30 may be different than a second distance between the quantum light device 20 and the second wing device 40. This means that when a pair of photons is emitted to first wing device 30 and second wing device 40, the photons may in some cases return to quantum light device 20 at different times.

Photon detectors 26 of quantum light device 20 may receive the first set of photons and the second set of photons from the optical circuitry 24 (108). Each photon detector of photon detectors 26 may generate a set of time signals (110). In some examples, a first photon detector of photon detectors 26 may output a first set of time signals, wherein each time signal of the first set of time signals corresponds to a time in which the first photon detector receives a photon of the first set of photons or the second set of photons. In some examples, a second photon detector of photon detectors 26 may output a second set of time signals, wherein each time signal of the second set of time signals corresponds to a time in which the second photon detector receives a photon of the first set of photons or the second set of photons. In some examples, a third photon detector of photon detectors 26 may output a third set of time signals, wherein each time signal of the third set of time signals corresponds to a time in which the third photon detector receives a photon of the first set of photons or the second set of photons. In some examples, a fourth photon detector of photon detectors 26 may output a fourth set of time signals, wherein each time signal of the fourth set of time signals corresponds to a time in which the fourth photon detector receives a photon of the first set of photons or the second set of photons.

Processing circuitry 50 may determine, based on the set of time signals corresponding to each photon detector of photon detectors 26, whether a time delay value exists in which a CHSH parameter is greater than a threshold CHSH parameter value (112). In some examples, processing circuitry 50 is configured to determine a first correlation parameter corresponding to a correlation between a first photon detector of photon detectors 26 and a third photon detector of photon detectors 26. In some examples, processing circuitry 50 is configured to determine a second correlation parameter corresponding to a correlation between the first photon detector of photon detectors 26 and a fourth photon detector of photon detectors 26. In some examples, processing circuitry 50 is configured to determine a third correlation parameter corresponding to a correlation between a second photon detector of photon detectors 26 and the third photon detector of photon detectors 26. In some examples, processing circuitry 50 is configured to determine a fourth correlation parameter corresponding to a correlation between the second photon detector of photon detectors 26 and the fourth photon detector of photon detectors 26. In some examples, processing circuitry 50 may calculate a sum of the first correlation parameter, the second correlation parameter, the third correlation parameter, and the fourth correlation parameter to determine the CHSH parameter.

The following examples are examples systems, devices, and methods described herein.

Example 1: A system comprising: a quantum light device comprising: a light source configured to emit a plurality of pairs of photons, wherein each pair of photons of the plurality of pairs of photons occupies a quantum entangled state; optical circuitry configured to: receive, from a first wing device, a first set of photons of the plurality of pairs of photons; and receive, from a second wing device, a second set of photons of the plurality of pairs of photons. Additionally, the quantum light device comprises: a set of photon detectors configured to receive the first set of photons and the second set of photons from the optical circuitry, wherein each photon detector of the set of photon detectors is configured to generate a set of time signals, each time signal of the set of time signals representing a time at which the respective photon sensors detects a photon. Additionally, the system comprises processing circuitry configured to: determine, based on the set of time signals corresponding to each photon detector of the set of photon detectors, whether a time delay value exists in which a Clauser, Home, Shimony and Holt (CHSH) parameter is greater than a threshold CHSH parameter value.

Example 2: The system of example 1, wherein a first distance between the quantum light device and the first wing device is different than a second distance between the quantum light device and the second wing device, and wherein the time delay value corresponds to a difference between the first distance and the second distance.

Example 3: The system of any of examples 1-2, wherein to emit the plurality of pairs of photons, the light source is configured to: emit one photon of each pair of photons of the plurality of pairs of photons to the first wing device; and emit one photon of each pair of photons of the plurality of pairs of photons to the second wing device.

Example 4: The system of any of examples 1-3, wherein the set of photon detectors are configured to: output, by a first photon detector of the set of photon detectors, a first set of time signals, wherein each time signal of the first set of time signals corresponds to a time in which the first photon detector receives a photon of the first set of photons or the second set of photons; output, by a second photon detector of the set of photon detectors, a second set of time signals, wherein each time signal of the second set of time signals corresponds to a time in which the second photon detector receives a photon of the first set of photons or the second set of photons; output, by a third photon detector of the set of photon detectors, a third set of time signals, wherein each time signal of the third set of time signals corresponds to a time in which the third photon detector receives a photon of the first set of photons or the second set of photons; and output, by a fourth photon detector of the set of photon detectors, a fourth set of time signals, wherein each time signal of the fourth set of time signals corresponds to a time in which the fourth photon detector receives a photon of the first set of photons or the second set of photons.

Example 5: The system of example 4, wherein the time delay value corresponds to a time delay between a first photon of a pair of photons occupying a quantum entangled state arriving at the first photon detector or the second photon detector and a second photon of the pair of photons arriving at the third photon detector or the fourth photon detector.

Example 6: The system of any of examples 4-5, wherein the processing circuitry is further configured to: determine a first correlation parameter corresponding to a correlation between the first photon detector and the third photon detector; determine a second correlation parameter corresponding to a correlation between the first photon detector and the fourth photon detector; determine a third correlation parameter corresponding to a correlation between the second photon detector and the third photon detector; determine a fourth correlation parameter corresponding to a correlation between the second photon detector and the fourth photon detector; and calculate a sum of the first correlation parameter, the second correlation parameter, the third correlation parameter, and the fourth correlation parameter to determine the CHSH parameter.

Example 7: The system of any of examples 1-6, wherein the light source is configured to emit each pair of photons of the plurality of pairs of photons at a random time.

Example 8: The system of any of examples 1-7, wherein the quantum entangled state comprises a Bell state of a set of Bell states.

Example 9: The system of any of examples 1-8, wherein the processing circuitry is further configured to verify, based on a time delay value existing in which a CHSH parameter is greater than the threshold CHSH parameter value, that communication between the quantum light device and the first wing device and communication between the quantum light device and the second wing device is secure.

Example 10: The system of any of examples 1-9, wherein the light source is configured to emit the plurality of pairs of photons so that, for each pair of photons of the plurality of pairs of photons, a time separating a first photon of the respective pair of photons and a second photon of the respective pair of photons is less than 100 femtoseconds.

Example 11: The system of any of examples 1-10, wherein to determine whether the time delay value exists in which the CHSH parameter is greater than the threshold CHSH parameter value, the processing circuitry is configured to: determine a plurality of CHSH parameters, wherein each CHSH parameter of the plurality of CHSH parameters corresponds to a respective time delay value of a plurality of time delay values; and determine whether a CHSH parameter of the plurality of CHSH parameters is greater than the threshold CHSH parameter value.

Example 12: The system of any of examples 1-11, wherein the quantum light device is configured to output the time delay value to the first wing device and the second wing device to synchronize a first atomic clock of the first wing device with a second atomic clock located of the second wing device.

Example 13: A method comprising: emitting, by a light source of a quantum light device, a plurality of pairs of photons, wherein each pair of photons of the plurality of pairs of photons occupies a quantum entangled state; receiving, by optical circuitry of the quantum light device, a first set of photons of the plurality of pairs of photons from a first wing device; receiving, by the optical circuitry, a second set of photons of the plurality of pairs of photons from a second wing device; and receiving, by a set of photon detectors of the quantum light device, the first set of photons and the second set of photons from the optical circuitry. Additionally, the method comprises: generating, by each photon detector of the set of photon detectors, a set of time signals, each time signal of the set of time signals representing a time at which the respective photon sensors detects a photon; and determining, by processing circuitry based on the set of time signals corresponding to each photon detector of the set of photon detectors, whether a time delay value exists in which a Clauser, Home, Shimony and Holt (CHSH) parameter is greater than a threshold CHSH parameter value.

Example 14: The method of example 13, wherein a first distance between the quantum light device and the first wing device is different than a second distance between the quantum light device and the second wing device, and wherein the time delay value corresponds to a difference between the first distance and the second distance.

Example 15: The method of any of examples 13-14, wherein emitting the plurality of pairs of photons comprises: emitting, by the light source, one photon of each pair of photons of the plurality of pairs of photons to the first wing device; and emitting, by the light source, one photon of each pair of photons of the plurality of pairs of photons to the second wing device.

Example 16: The method of any of examples 13-14, further comprising: outputting, by a first photon detector of the set of photon detectors, a first set of time signals, wherein each time signal of the first set of time signals corresponds to a time in which the first photon detector receives a photon of the first set of photons or the second set of photons; outputting, by a second photon detector of the set of photon detectors, a second set of time signals, wherein each time signal of the second set of time signals corresponds to a time in which the second photon detector receives a photon of the first set of photons or the second set of photons; outputting, by a third photon detector of the set of photon detectors, a third set of time signals, wherein each time signal of the third set of time signals corresponds to a time in which the third photon detector receives a photon of the first set of photons or the second set of photons; and outputting, by a fourth photon detector of the set of photon detectors, a fourth set of time signals, wherein each time signal of the fourth set of time signals corresponds to a time in which the fourth photon detector receives a photon of the first set of photons or the second set of photons.

Example 17: The method of example 16, further comprising: determining, by the processing circuitry, a first correlation parameter corresponding to a correlation between the first photon detector and the third photon detector; determining, by the processing circuitry, a second correlation parameter corresponding to a correlation between the first photon detector and the fourth photon detector; determining, by the processing circuitry, a third correlation parameter corresponding to a correlation between the second photon detector and the third photon detector; determining, by the processing circuitry, a fourth correlation parameter corresponding to a correlation between the second photon detector and the fourth photon detector; and calculating, by the processing circuitry, a sum of the first correlation parameter, the second correlation parameter, the third correlation parameter, and the fourth correlation parameter to determine the CHSH parameter.

Example 18: The method of any of examples 13-17, wherein emitting each pair of photons of the pair of photons comprises emitting each pair of photons of the pair of photons at a random time.

Example 19: The method of any of examples 13-18, further comprising verifying, by the processing circuitry based on a time delay value existing in which a CHSH parameter is greater than the threshold CHSH parameter value, that communication between the quantum light device and the first wing device and communication between the quantum light device and the second wing device is secure.

Example 20: A non-transitory computer readable medium comprising instructions that when executed cause one or more processors to: control a light source of a quantum light device to emit a plurality of pairs of photons, wherein each pair of photons of the plurality of pairs of photons occupies a quantum entangled state; cause optical circuitry of the quantum light device to receive a first set of photons of the plurality of pairs of photons from a first wing device; cause the optical circuitry to receive a second set of photons of the plurality of pairs of photons from a second wing device; cause a set of photon detectors of the quantum light device to receive the first set of photons and the second set of photons from the optical circuitry; cause each photon detector of the set of photon detectors to generate a set of time signals, each time signal of the set of time signals representing a time at which the respective photon sensors detects a photon; and determine, based on the set of time signals corresponding to each photon detector of the set of photon detectors, whether a time delay value exists in which a Clauser, Home, Shimony and Holt (CHSH) parameter is greater than a threshold CHSH parameter value.

In one or more examples, the techniques described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the system or communicatively coupled to the system. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A system comprising:
   a quantum light device comprising:
   a light source configured to emit a plurality of pairs of photons, wherein each pair of photons of the plurality of pairs of photons occupies a quantum entangled state;
   optical circuitry configured to:
   receive, from a first wing device, a first set of photons of the plurality of pairs of photons; and
   receive, from a second wing device, a second set of photons of the plurality of pairs of photons;
   a set of photon detectors configured to receive the first set of photons and the second set of photons from the optical circuitry,
   wherein each photon detector of the set of photon detectors is configured to generate a set of time signals, each time signal of the set of time signals representing a time at which the respective photon sensors detects a photon; and processing circuitry configured to:
   determine, based on the set of time signals corresponding to each photon detector of the set of photon detectors, whether a time delay value exists in which a Clauser, Home, Shimony and Holt (CHSH) parameter is greater than a threshold CHSH parameter value.

2. The system of claim 1, wherein a first distance between the quantum light device and the first wing device is different than a second distance between the quantum light device and the second wing device, and wherein the time delay value corresponds to a difference between the first distance and the second distance.

3. The system of claim 1, wherein to emit the plurality of pairs of photons, the light source is configured to:
   emit one photon of each pair of photons of the plurality of pairs of photons to the first wing device; and
   emit one photon of each pair of photons of the plurality of pairs of photons to the second wing device.

4. The system of claim 1, wherein the set of photon detectors are configured to:
   output, by a first photon detector of the set of photon detectors, a first set of time signals, wherein each time signal of the first set of time signals corresponds to a time in which the first photon detector receives a photon of the first set of photons or the second set of photons;
   output, by a second photon detector of the set of photon detectors, a second set of time signals, wherein each time signal of the second set of time signals corresponds to a time in which the second photon detector receives a photon of the first set of photons or the second set of photons;
   output, by a third photon detector of the set of photon detectors, a third set of time signals, wherein each time signal of the third set of time signals corresponds to a time in which the third photon detector receives a photon of the first set of photons or the second set of photons; and
   output, by a fourth photon detector of the set of photon detectors, a fourth set of time signals, wherein each time signal of the fourth set of time signals corresponds to a time in which the fourth photon detector receives a photon of the first set of photons or the second set of photons.

5. The system of claim 4, wherein the time delay value corresponds to a time delay between a first photon of a pair of photons occupying a quantum entangled state arriving at the first photon detector or the second photon detector and a second photon of the pair of photons arriving at the third photon detector or the fourth photon detector.

6. The system of claim 4, wherein the processing circuitry is further configured to:
   determine a first correlation parameter corresponding to a correlation between the first photon detector and the third photon detector;
   determine a second correlation parameter corresponding to a correlation between the first photon detector and the fourth photon detector;
   determine a third correlation parameter corresponding to a correlation between the second photon detector and the third photon detector;
   determine a fourth correlation parameter corresponding to a correlation between the second photon detector and the fourth photon detector; and calculate a sum of the first correlation parameter, the second correlation parameter, the third correlation parameter, and the fourth correlation parameter to determine the CHSH parameter.

7. The system of claim 1, wherein the light source is configured to emit each pair of photons of the plurality of pairs of photons at a random time.

8. The system of claim 1, wherein the quantum entangled state comprises a Bell state of a set of Bell states.

9. The system of claim 1, wherein the processing circuitry is further configured to verify, based on the time delay value existing in which a CHSH parameter is greater than the threshold CHSH parameter value, that communication between the quantum light device and the first wing device and communication between the quantum light device and the second wing device is secure.

10. The system of claim 1, wherein the light source is configured to emit the plurality of pairs of photons so that, for each pair of photons of the plurality of pairs of photons, a time separating a first photon of the respective pair of photons and a second photon of the respective pair of photons is less than 100 femtoseconds.

11. The system of claim 1, wherein to determine whether the time delay value exists in which the CHSH parameter is greater than the threshold CHSH parameter value, the processing circuitry is configured to:
determine a plurality of CHSH parameters, wherein each CHSH parameter of the plurality of CHSH parameters corresponds to a respective time delay value of a plurality of time delay values; and
determine whether a CHSH parameter of the plurality of CHSH parameters is greater than the threshold CHSH parameter value.

12. The system of claim 1, wherein the quantum light device is configured to output the time delay value to the first wing device and the second wing device to synchronize a first atomic clock of the first wing device with a second atomic clock located of the second wing device.

13. A method comprising:
emitting, by a light source of a quantum light device, a plurality of pairs of photons, wherein each pair of photons of the plurality of pairs of photons occupies a quantum entangled state;
receiving, by optical circuitry of the quantum light device, a first set of photons of the plurality of pairs of photons from a first wing device;
receiving, by the optical circuitry, a second set of photons of the plurality of pairs of photons from a second wing device;
receiving, by a set of photon detectors of the quantum light device, the first set of photons and the second set of photons from the optical circuitry;
generating, by each photon detector of the set of photon detectors, a set of time signals, each time signal of the set of time signals representing a time at which the respective photon sensors detects a photon; and
determining, by processing circuitry based on the set of time signals corresponding to each photon detector of the set of photon detectors, whether a time delay value exists in which a Clauser, Horne, Shimony and Holt (CHSH) parameter is greater than a threshold CHSH parameter value.

14. The method of claim 13, wherein a first distance between the quantum light device and the first wing device is different than a second distance between the quantum light device and the second wing device, and wherein the time delay value corresponds to a difference between the first distance and the second distance.

15. The method of claim 13, wherein emitting the plurality of pairs of photons comprises:
emitting, by the light source, one photon of each pair of photons of the plurality of pairs of photons to the first wing device; and
emitting, by the light source, one photon of each pair of photons of the plurality of pairs of photons to the second wing device.

16. The method of claim 13, further comprising:
outputting, by a first photon detector of the set of photon detectors, a first set of time signals, wherein each time signal of the first set of time signals corresponds to a time in which the first photon detector receives a photon of the first set of photons or the second set of photons;
outputting, by a second photon detector of the set of photon detectors, a second set of time signals, wherein each time signal of the second set of time signals corresponds to a time in which the second photon detector receives a photon of the first set of photons or the second set of photons;
outputting, by a third photon detector of the set of photon detectors, a third set of time signals, wherein each time signal of the third set of time signals corresponds to a time in which the third photon detector receives a photon of the first set of photons or the second set of photons; and
outputting, by a fourth photon detector of the set of photon detectors, a fourth set of time signals, wherein each time signal of the fourth set of time signals corresponds to a time in which the fourth photon detector receives a photon of the first set of photons or the second set of photons.

17. The method of claim 16, further comprising:
determining, by the processing circuitry, a first correlation parameter corresponding to a correlation between the first photon detector and the third photon detector;
determining, by the processing circuitry, a second correlation parameter corresponding to a correlation between the first photon detector and the fourth photon detector;
determining, by the processing circuitry, a third correlation parameter corresponding to a correlation between the second photon detector and the third photon detector;
determining, by the processing circuitry, a fourth correlation parameter corresponding to a correlation between the second photon detector and the fourth photon detector; and
calculating, by the processing circuitry, a sum of the first correlation parameter, the second correlation parameter, the third correlation parameter, and the fourth correlation parameter to determine the CHSH parameter.

18. The method of claim 13, wherein emitting each pair of photons of the pair of photons comprises emitting each pair of photons of the pair of photons at a random time.

19. The method of claim 13, further comprising verifying, by the processing circuitry based on the time delay value existing in which a CHSH parameter is greater than the threshold CHSH parameter value, that communication between the quantum light device and the first wing device and communication between the quantum light device and the second wing device is secure.

20. A non-transitory computer readable medium comprising instructions that when executed cause one or more processors to:
- control a light source of a quantum light device to emit a plurality of pairs of photons, wherein each pair of photons of the plurality of pairs of photons occupies a quantum entangled state;
- cause optical circuitry of the quantum light device to receive a first set of photons of the plurality of pairs of photons from a first wing device;
- cause the optical circuitry to receive a second set of photons of the plurality of pairs of photons from a second wing device;
- cause a set of photon detectors of the quantum light device to receive the first set of photons and the second set of photons from the optical circuitry;
- cause each photon detector of the set of photon detectors to generate a set of time signals, each time signal of the set of time signals representing a time at which the respective photon sensors detects a photon; and
- determine, based on the set of time signals corresponding to each photon detector of the set of photon detectors, whether a time delay value exists in which a Clauser, Home, Shimony and Holt (CHSH) parameter is greater than a threshold CHSH parameter value.

* * * * *